US008726487B2

(12) United States Patent
Briese et al.

(10) Patent No.: US 8,726,487 B2

(45) Date of Patent: May 20, 2014

(54) EFFICIENT ASSEMBLY OF DOUBLE OR TRIPLE PANE WINDOWS

(75) Inventors: William Briese, Hinckley, OH (US); John Grismer, Cuyahoga Falls, OH (US); Timothy B. McGlinchy, Twinsburg, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 1038 days.

(21) Appl. No.: 12/765,064

(22) Filed: Apr. 22, 2010

(65) Prior Publication Data

US 2010/0287756 A1 Nov. 18, 2010

Related U.S. Application Data

(60) Provisional application No. 61/177,368, filed on May 12, 2009.

(51) Int. Cl.
*B23Q 15/00* (2006.01)

(52) U.S. Cl.
USPC ............ 29/564.6; 29/414; 29/469.5; 29/791; 156/64

(58) Field of Classification Search
CPC .. B32B 38/1841; B32B 37/025; B32B 37/08; B32B 2451/00; B44C 1/105; E06B 3/6604; E06B 3/67321; E06B 3/67304; B21D 5/08
USPC ........................ 29/430, 432, 469.5, 469, 563, 29/564.6–564.8, 791; 156/212–216, 64, 156/358–360; 198/346–346.2
See application file for complete search history.

(56) References Cited

U.S. PATENT DOCUMENTS

| | | | | |
|---|---|---|---|---|
| 3,876,489 | A | 4/1975 | Chenel | |
| 4,780,164 | A * | 10/1988 | Rueckheim et al. | 156/104 |
| 5,313,761 | A | 5/1994 | Leopold | |
| 5,573,618 | A * | 11/1996 | Rueckheim | 156/104 |
| 5,678,377 | A | 10/1997 | Leopold | |
| 6,553,653 | B2 | 4/2003 | Hulings et al. | |
| 6,678,938 | B2 * | 1/2004 | McGlinchy et al. | 29/564.6 |
| 6,868,884 | B2 * | 3/2005 | Briese | 156/358 |
| 6,889,416 | B2 * | 5/2005 | McGlinchy | 29/469.5 |
| 6,898,833 | B2 * | 5/2005 | Ashton | 29/33 P |
| 7,445,682 | B2 * | 11/2008 | James et al. | 156/64 |
| 7,785,432 | B2 * | 8/2010 | Lenhardt | 156/109 |
| 7,901,526 | B2 * | 3/2011 | James et al. | 156/64 |
| 2002/0020054 | A1 | 2/2002 | Hulings et al. | |

(Continued)

OTHER PUBLICATIONS

International Search Report and Written Opinion, 21 pages, dated Apr. 24, 2012 for International Application No. PCT/US2011/066055.

*Primary Examiner* — Minh Trinh

(74) *Attorney, Agent, or Firm* — Tarolli, Sundheim, Covell & Tummino LLP

(57) ABSTRACT

This invention describes a process flow, method and apparatus to assemble triple IG units without contaminating the center glass lite. A non-contact vacuum pad is used to lift a glass lite off from a horizontal or vertical support that conveys it from a glass washer to an assembly station. Each of multiple pads has a capacity to lift approximately seven to ten pounds. Use of multiple pads per glass sheet or lite allows lites having, dimensions up to 70 by 100 inches (assuming glass thickness of one quarter inch) to be assembled.

8 Claims, 11 Drawing Sheets

(56) References Cited

U.S. PATENT DOCUMENTS

| | | | |
|---|---|---|---|
| 2003/0146066 A1 | 8/2003 | Ashton | |
| 2006/0037688 A1 | 2/2006 | Briese et al. | |
| 2006/0042315 A1 | 3/2006 | Chang et al. | |
| 2007/0175733 A1 | 8/2007 | Lenhardt | |
| 2010/0052345 A1 | 3/2010 | Chang et al. | |
| 2010/0287756 A1 * | 11/2010 | Briese et al. | 29/462 |

* cited by examiner

EFFICIENT ASSEMBLY OF DOUBLE OR TRIPLE PANE WINDOWS

GOVERNMENT INTEREST

This invention was made with Government Support under DE-NT0000167 awarded by DOE. The Government has certain rights in this invention.

CROSS REFERENCE TO RELATED APPLICATIONS

The present application claims priority from provisional U.S. Patent application Ser. No. 61/177,368 filed May 12, 2009 and which is incorporated herein in its entirety.

FIELD OF THE INVENTION

The present disclosure relates to efficient assembly of triple pane windows that avoids contamination of the center pane during assembly.

BACKGROUND

One construction of insulating glass units (IGU's) involves forming a spacer frame by roll-forming a flat metal strip, into an elongated hollow rectangular tube or "U" shaped channel. A desiccant material is placed within the rectangular tube or channel, and some provisions are made for the desiccant to come into fluid communication with or otherwise affect the interior space of the insulated glass unit. The elongated tube or channel is notched to allow the channel to be formed into a rectangular frame. A sealant is applied to the outer sides of the spacer frame in order to bond two glass panes or lites to opposite side of the spacer frame. Existing heated sealants include hot melts and dual seal equivalents (DSE). This system is not limited to these spacer frame types; other spacer frame technologies that are generally known in the industry can also be used with this system. The pair of glass panes are positioned on the spacer frame to form a pre-pressed insulating glass unit. Generally, the pre-pressed insulating glass unit is passed through an IGU oven to melt or activate the sealant. The pre-pressed insulating glass unit is then passed through a press that applies pressure to the glass and sealant and compresses the IGU to a selected pressed unit thickness. The completed IGU is used to fabricate a window or door.

It is known to construct triple pane IGUs having three panes or lites. Two outer panes contact spacer frames which separate the outer panes from a center or inner pane. When assembling an IG unit, it is important that the glass surfaces that are on the inside airspace remain uncontaminated for two reasons (1) preventing visual defects that cannot be cleaned and (2) preventing contamination of the perimeter of the glass which needs to remain clean or else the adhesive bond between the spacer seal and glass can be compromised ultimately leading to a seal failure.

GED, assignee of the present invention, currently manufactures an assembly system which conveys two lites of glass parallel to each other horizontally through a glass washer. One lite gets a spacer applied and the other passes through untouched. The two pieces of glass are conveyed and aligned onto a pair of vertical pivoting tables that bring the two pieces of glass together. The advantage to this system is that the glass surfaces that are on the inside of the IG are never touched by the conveyance system after the glass has left a glass washer, thus assuring the inside glass remains clean and contaminant free. This arrangement works very well for conventional dual glazed IG, but is not conducive for fabricating triple IG's. A current difficulty with assembling triple IG units is keeping all inside glass surfaces (Surfaces 2, 3, 4 & 5 on FIG. 4) contaminant free. With the current arrangement it is typical that the inner glass surfaces will make substantial contact with the conveyance system which presents a high risk of contamination of these surfaces.

Process Flow for Conventional (Dual) IG Units; FIGS. 1 & 3:

1. Lite A leaves a washer and is conveyed by conveyors 10, 12 to a spacer assembly station 20 where a spacer 22 gets applied to the sheet A.
2. Lite B leaves the washer and is conveyed down conveyors 30, 32, 34, 36 and waits for lite A.
3. When both lites are staged, conveyors move the corresponding lites to butterfly conveyors 40, 42.
4. The butterfly tables 50, 52 (FIGS. 13 and 14) pivot to vertical.
5. Glass or lite B on the conveyor 42 is pushed onto conveyor 40 against the lite having the spacer.
6. The butterfly tables pivot back to horizontal.
7. The assembled dual IG unit is conveyed out of conveyors 60, 62 and to an oven for downstream processing.

This process flow is well established. Note that each conveyor set (i.e. two adjacent conveyors) are split into separate drive zones. This facilitates the ability to simultaneously process smaller IG's. If a sensor detects an IG over a certain length, in this case over 49", only one IG is processed at a time.

SUMMARY

The disclosure describes a process flow and method and a system for assembling triple IG units (IGU's) without contaminating the center glass lite. A non-contact vacuum pad is used to lift a glass lite off from a horizontal support that conveys it from a glass washer to an assembly station. Each of multiple pads has a capacity to lift approximately seven to ten pounds. Use of multiple pads per glass sheet or lite allows lites having dimensions up to 70 by 100 inches (assuming glass thickness of one quarter inch) to be assembled.

An exemplary process of assembling triple pane insulating glass units uses two spacer frames that have sealant applied to opposite sides. Glass lites or panes of a specified size are washed and moved to an assembly station. A first glass lite is attached to a first spacer frame and a second glass lite is caused to hover over a surface. The first glass lite (and attached spacer frame) is moved into registration beneath the hovering glass lite. The second glass lite is then brought into contact with sealant on the spacer frame to which the first glass lite is attached. The combination of the first and second glass lites and the spacer frame are moved to a downstream workstation.

At the downstream workstation a second spacer frame and third glass lite that is attached to the second spacer frame are brought into registration with the combined first and second glass lites. A middle glass lite (the hovering glass lite at the upstream station) is pressed against an exposed surface of one of said first and second lites into engagement with sealant on the second spacer frame to configure the triple pane insulating glass unit. This unit is then thermally treated so that sealant securely holds the panes to the frames of the triple pane insulating glass unit together.

Low-E coatings on any inside surface (Surfaces 2, 3, 4 & 5 on FIG. 4) and muntins in (airspace #1 or #2 on FIG. 4) must be safeguarded from contamination. A plurality of finished product combinations are accommodated in the product flow and the system needs to be able to handle these combinations. Muntins can be inserted into airspace 1 or airspace 2.

These and other objects, advantages and features of the disclosed system will be better understood by reference to the accompanying drawings and their description.

The exemplary system depicts a primarily horizontal transport and assembly of triple IGU. It is conceivable that similar technologies employed by this patent can be adapted to a primarily vertical arrangement.

DETAILED DESCRIPTION OF AN EXEMPLARY EMBODIMENT

Figure 1:
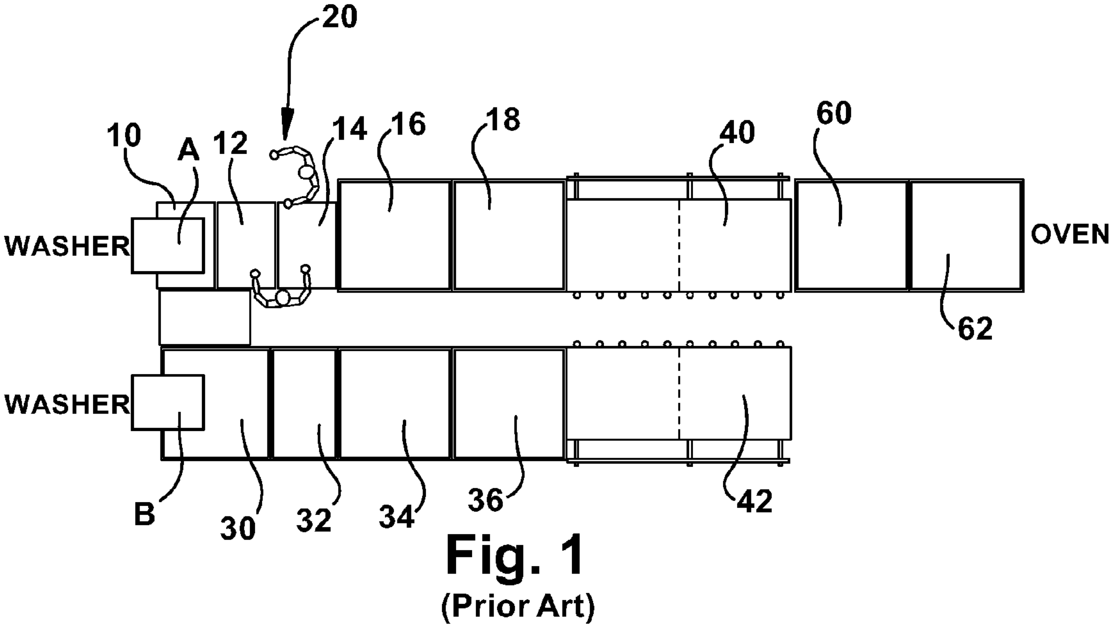
Fig. 1 (Prior Art)
FIG. 1 is a schematic view of a conventional two pane assembly process.

The figures illustrate an assembly station 110 for assembling triple pane insulating glass units (IGUs). An overhead conveyor (not shown) delivers IGU spacer frames. U.S. Pat. No. 5,313,761, incorporated herein by reference for all purposes has a for more complete description of an IGU. Sealant is applied to opposite sides of the frames for constructing triple pane insulating glass units. At the assembly station 110, glass lites of a specified size that have been washed are moved to the assembly station 110. FIG. 2A illustrates one lite 112 that has been manually brought into registration with and attached to a first spacer frame 113 for movement on a generally flat surface 114 in the direction of the arrow 116. The combination of the one lite 112, a first spacer frame 113 and a muntin grid 115 that is attached to the spacer frame move along a travel path indicated by the arrow 116 away from the location they are assembled by placing the frame 113 onto the top of the glass lite. The frame 113 extends around an outer perimeter of the lite 112 and when a muntin grid 115 is included the grid fastens to the frame at certain locations defined by cutouts in the spacer frame.

A second glass lite 120 moves in the direction of an arrow 117 along a flat surface 118 out of the washer to a registration station 30 wherein the lite 120 is caused to hover over a generally flat surface. The first lite 112 and its associated spacer frame (and as depicted in FIG. 2A, muntin grid) is then moved into registration beneath the hovering glass lite 120. The second lite 120 is then lowered into contact with sealant on the spacer frame to which the first glass lite 112 is attached.

Figure 2B:
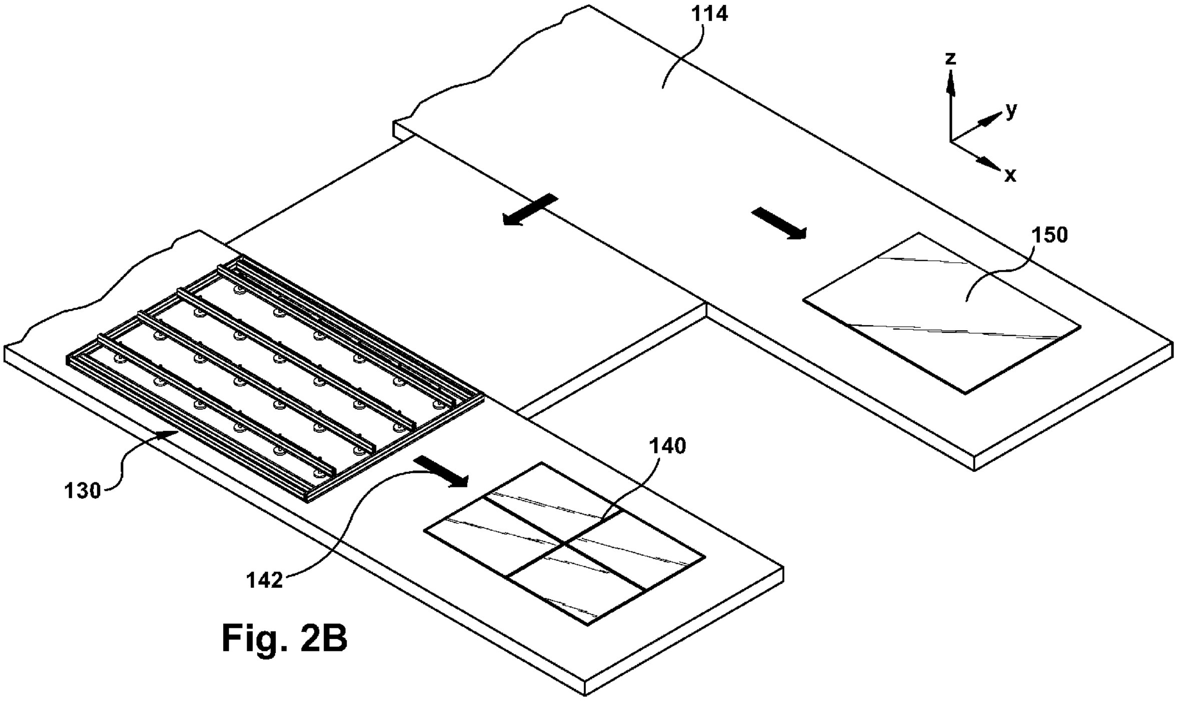
Figure 3:
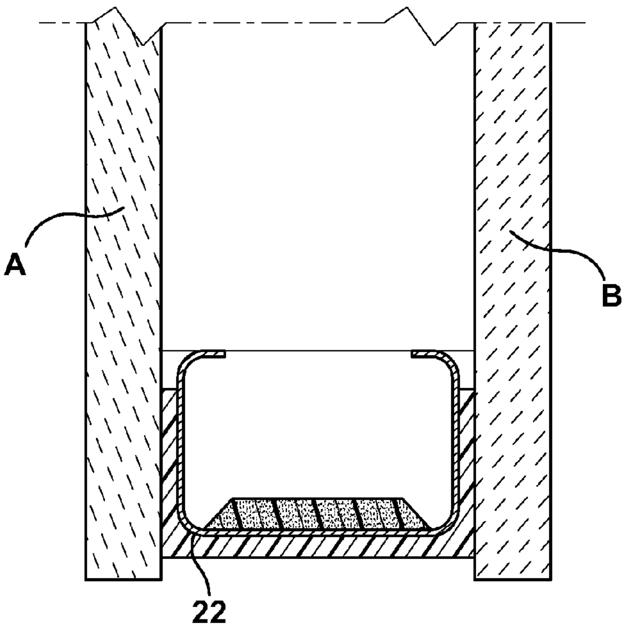
FIG. 3 is a section view of a two pane IGU.

The first and second lites as well as a spacer frame sandwiched between the first and second lites forms a combination 140 (FIG. 2B) similar to the two pane IGU shown in FIG. 3. The combination 140 is moved away from the registration station 130 in the direction of the arrow 142 to a downstream workstation. At the downstream workstation bringing a second spacer frame 144 (FIG. 4, note no muntin grid) and third glass lite 150 attached to the second spacer frame into registration with the combination 140 of the first and second glass lites by pressing an exposed surface of the second lite 120 (which was previously caused to hover at the registration station) into engagement with sealant on said second spacer frame to configure a triple pane insulating glass unit. Registration of the glass lites means that for the IGU, edges of the three lites align along all four sides within acceptable tolerances. After the triple pane IGU is configured, the IGU is routed through an oven wherein sealant holding the panes to the frames of the triple pane insulating glass unit is cured.

Figure 2:
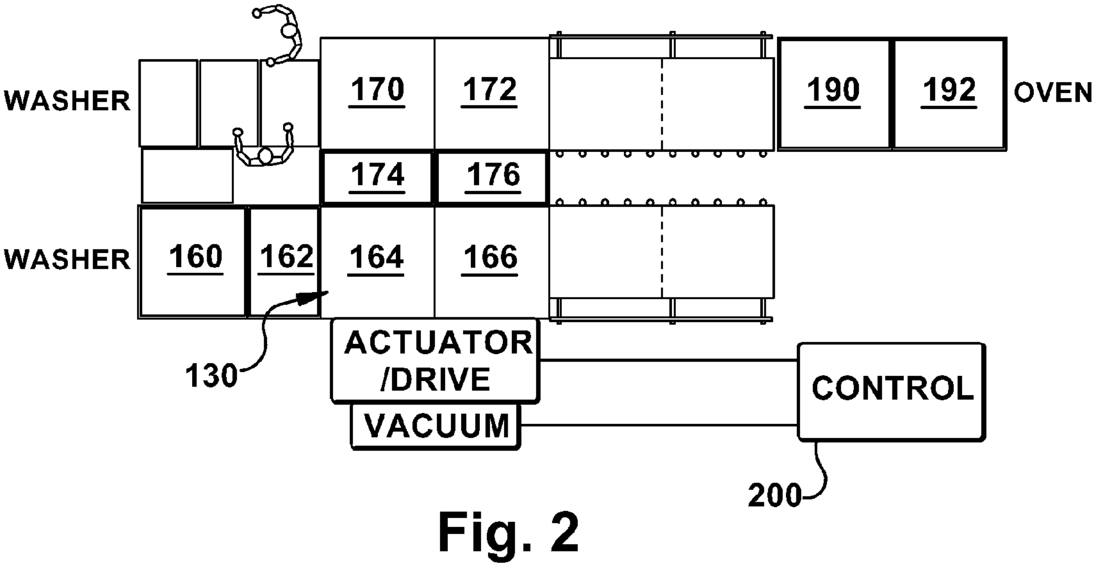
FIG. 2 is a schematic view of a new and improved triple pane assembly processes.
Figure 2A:
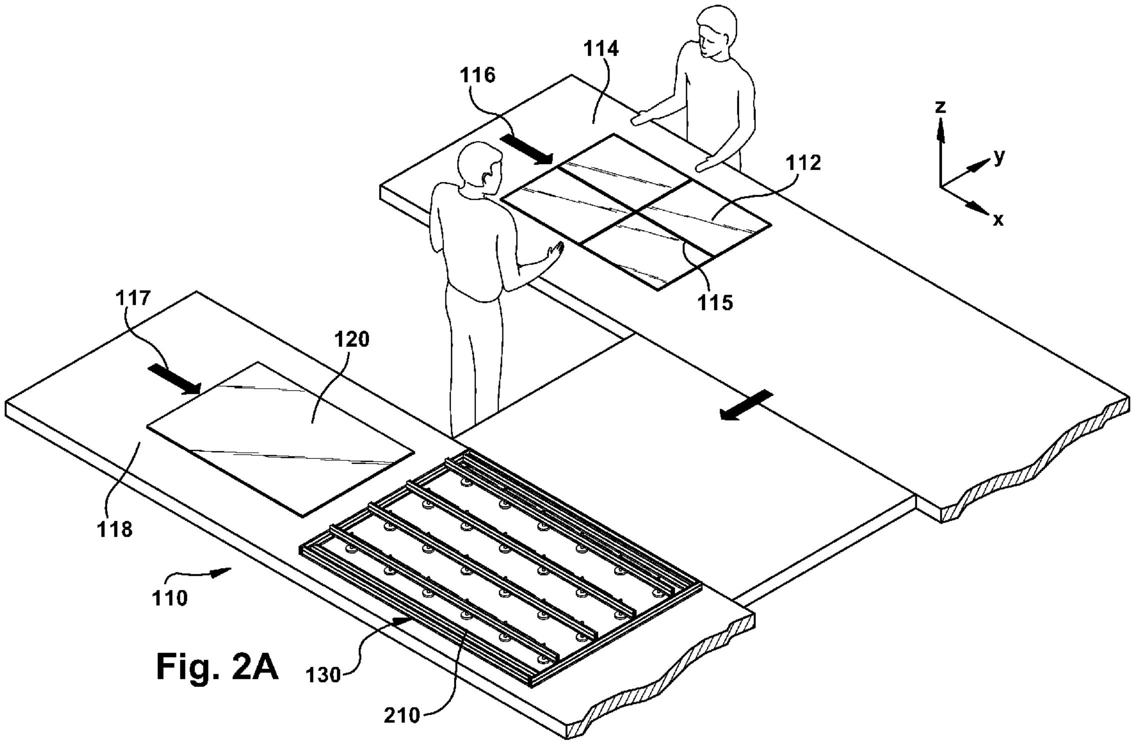
FIGS. 2A and 2B are perspective views of the triple pane assembly process.
Figure 4:
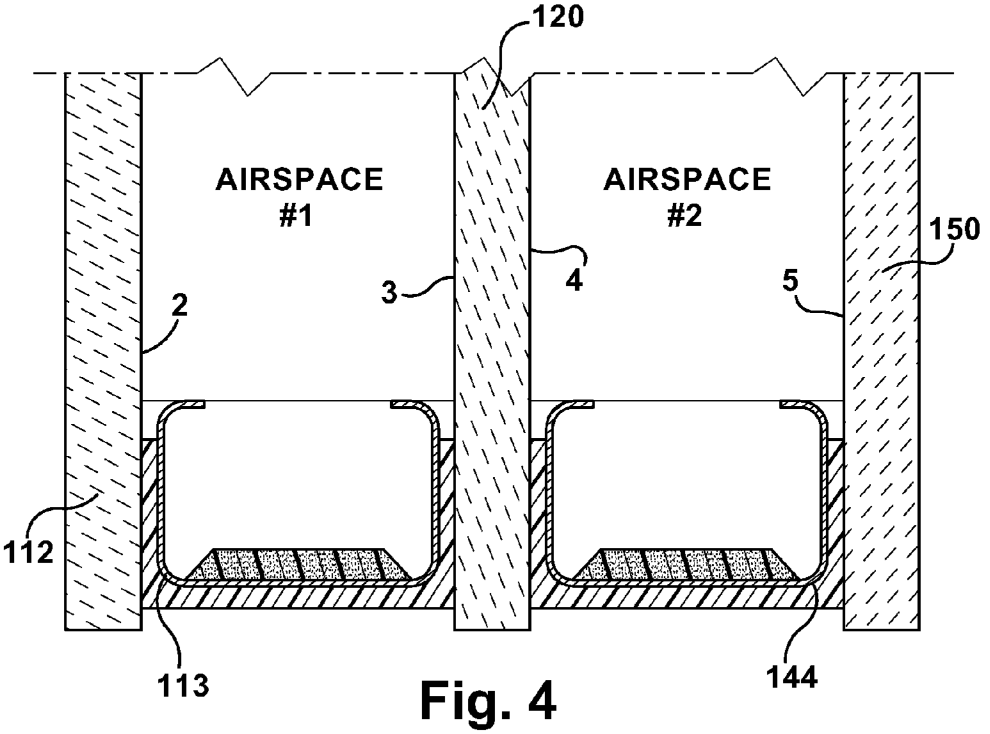
FIG. 4 is a section view of a three pane IGU.

A Process flow for triple IG units is depicted in FIGS. 2 & 4 and summarized with the following sequence of steps:

1. Lite 112 is conveyed to the spacer assembly station & spacer 113 is applied
2. Simultaneously, lite 120 is conveyed on conveyors 160, 162, 164, 166.
3. Lite 120 is registered at conveyor 166
4. Lite 120 is lifted by "No-Touch" vacuum system 210 and remains suspended
5. Lite 112 is conveyed to conveyor 172 and is x-y transferred by a conveyor 176.
6. Lite 112 is conveyed to conveyor 166 and registered underneath lite 120
7. Simultaneously, lite 150 is getting spacer applied
8. Lite 120 is lowered onto lite 112 (which has a spacer)
9. Sub-assembled lites 112, 120 are conveyed to butterfly assembly position
10. Simultaneously, lite 150 (which has a spacer 144) is conveyed to butterfly position
11. Butterfly tables 50, 52 cycle normally and the finished triple IGU exits to conveyor 190, 192

Note that Conveyors 160, 162, 164, 166 are an air flotation system which reduces the risk of the conveyor system marking lite 120 during transportation. With this process flow configuration, the order of the glass feed can be altered to suit placement of the low-e glass or muntins in the desired arrangement. Also, with the assembly flow depicted in FIG. 2, it is possible to run conventional (dual) IG units normally such as depicted in FIG. 1.

A vacuum system 210 is located above conveyors 164, 166 and has lifting pads that are unique in design. They generate a lifting force for lite 120 without making physical contact with the glass surface. This is important for the system's ability to not mark the glass during handling and assembly. One such non-contact lifting pad is made by SMC, called a "Cyclone Pad". A 100 mm diameter pad has the capacity to vertically lift 7-10 lbs per lifting pad. To lift a 70"×100"×¼" thick piece of glass, the vacuum system needs an array of pads spaced 18" apart. For this maximum glass size, it is estimated that 20 "Cyclone Pads" would be required. Twenty four pads in a six by four array are shown in FIG. 2B. Similar products that may employ different technologies are available from other manufacturers such as New Way and Bosch, but these products achieve the same end result—non-contact lifting of the glass. Since the vacuum lifting system does not touch the glass, the glass has the ability to skate or move laterally. Therefore the glass needs to be registered and clamped on the edges to prevent lateral movement.

Non-Contact Glass Transport, Squaring and Lift System Description

As described above, it is important that during manufacture of an IGU that does not marks, residual dirt or smudges are not left on the glass caused by operators or the conveyance system, and it is especially difficult to accomplish this for triple IGU. This section describes more detail of the sequence summarized above for assembling the center lite 120 of a triple IG without making physical contact with the inner or outer flat surfaces of the lite.

Figure 6:
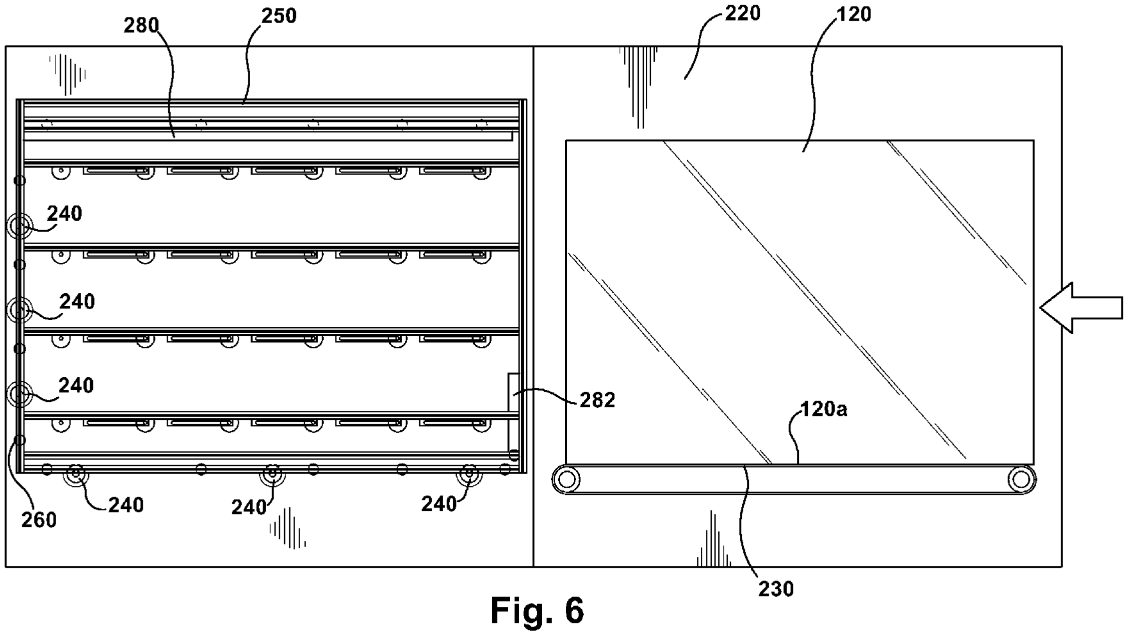
FIG. 6 is a plan view of a vacuum assembly and lite transfer station constructed in accordance with the invention.
Figure 7:
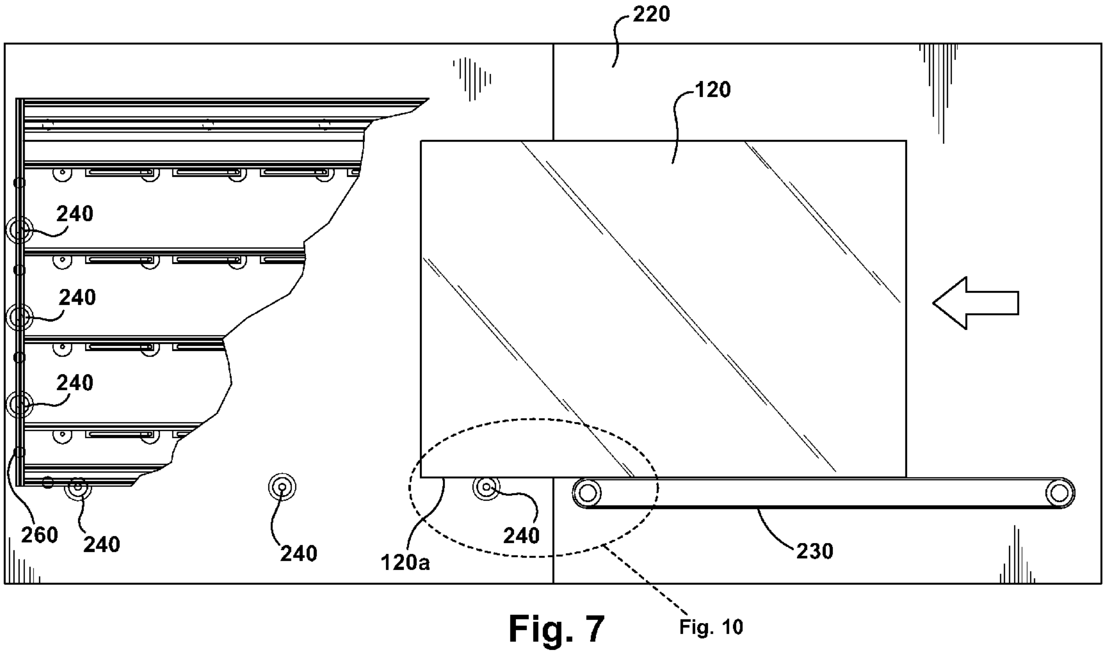
FIG. 7 shows a glass lite on a pivoting table as it is delivered to a registration position.
Figure 8:
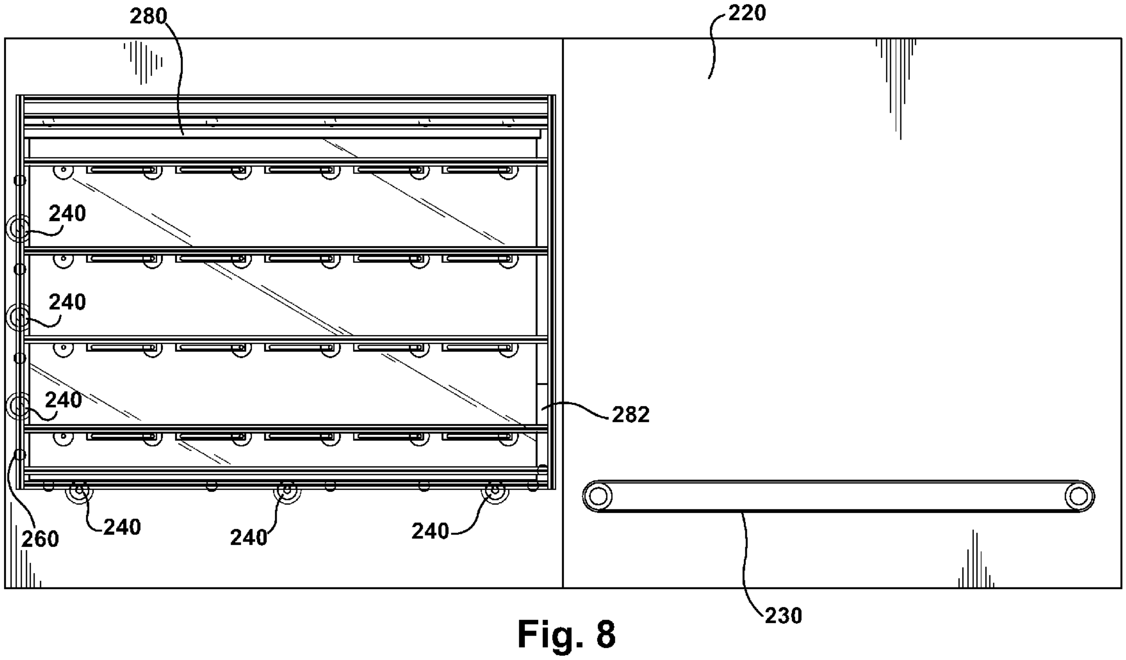
FIG. 8 is a schematic of the lite of FIG. 7 in registered position beneath a vacuum chuck assembly.
Figure 9:
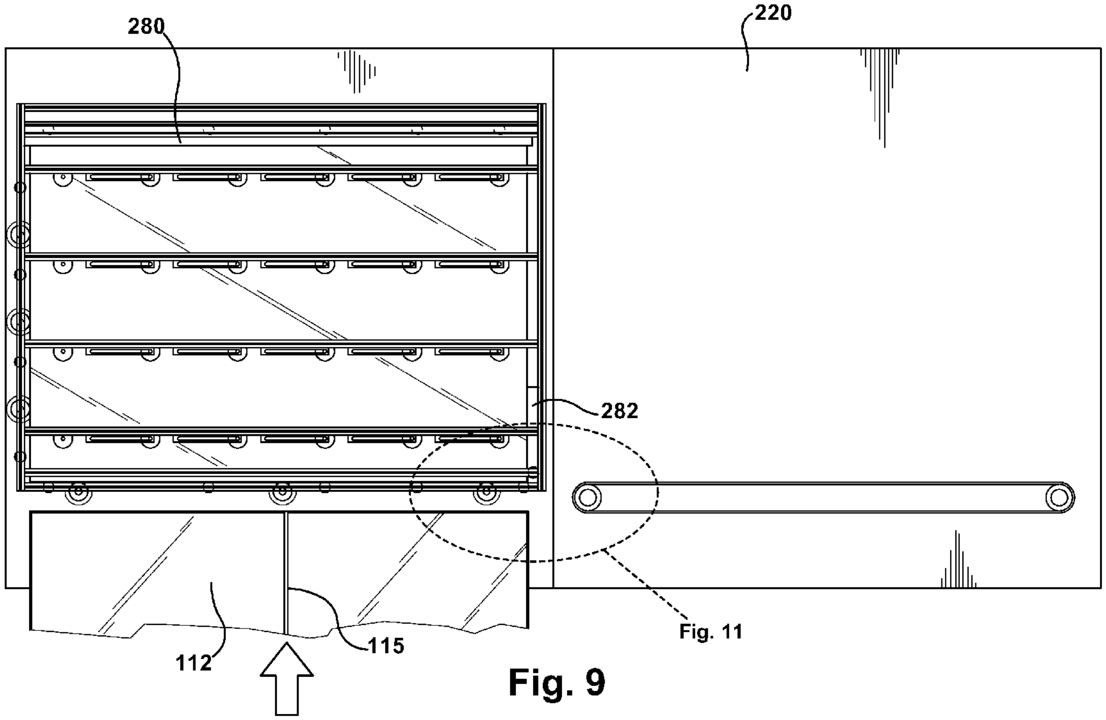
FIG. 9 shows a combined lite and spacer frame moving together into position beneath a lite hovering beneath the vacuum chuck assembly.
Figure 10:
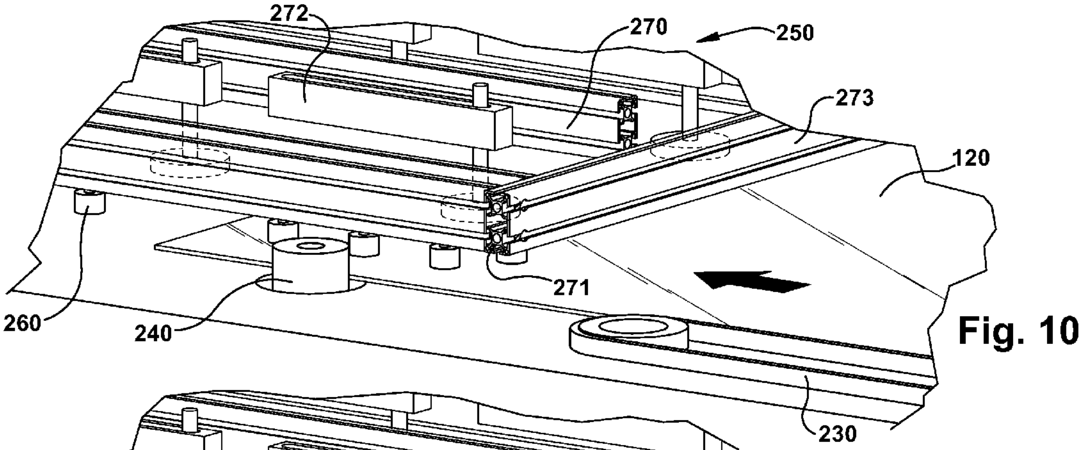
FIGS. 10 and 11 are perspective views of first and lite and then a combined lite and spacer frame moving into registration with each other.

Step 1: (FIG. 6) An air flotation table 220 on which the glass lite floats tilts or rotates about a rotation axis along an edge of the table (about 10 degrees) so that the center lite 120 rests against a drive belt 230. This will register one edge 120*a* of the glass and also provide a means to drive the glass lite 120 from the edge using the drive belt. Another method of indexing the glass to the next station would be to leave the tabletop horizontal and have push bars actuate until the glass is pressed firmly against the drive belt.

Step 2: Drive the center lite 120 into the registration/lift area at the registration station 130 in the region of conveyors 164, 166. The belt 230 is driven by a motor, and the gravity from tilting the table provides sufficient edge friction to drive the glass. Increasing the tilt angle will increase the drive friction which may be needed to stabilize the glass.

Step 3: Register the center lite 120. Pop up cylindrical stops 240 (FIG. 6) run parallel with the belt. These stops are also driven and will finish driving the glass lite into a corner of the registration station 130. Turn on the vacuum system and return the table beneath a vacuum frame assembly 250 to a flat orientation. At this point the entire vacuum frame assembly 250 lowers. The array of vacuum pads 252 are in close proximity to the glass because of an air bearing characteristic of the vacuum pad. The vacuum pads are spring mounted to a pivoting assembly to ensure that the edge of the pad does not contact or scratch the glass. The vacuum frame assembly 250 has a set of registration rollers 260 on two sides that are essentially in-line with the lower rollers 240. These rollers pivot slightly inward to push the glass away from the lower rollers. The glass is pushed from the other two sides against these stops by either an air cylinder or a belt. The center lite 120 is clamped by the vacuum frame assembly 250 and registered.

Figure 11:
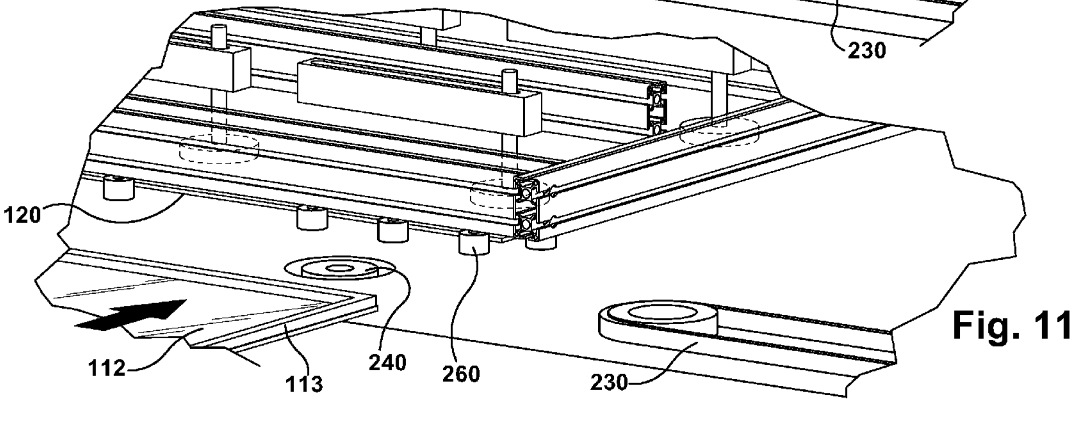

Step 4: Lift the center lite from the flotation tabletop. The FIG. 11 depiction shows an air cylinder lifting the entire vacuum frame assembly 250 with the glass lite 120 firmly clamped. A ball screw or acme screw arrangement is used to lift the vacuum frame assembly 250. The center lite at this time is suspended above the tabletop.

Step 5: The lower lite 112 has a spacer frame 113 (and possibly attached muntin grid) and is now being conveyed laterally across conveyor 176 (or depending on size of lite, conveyors 176, 174). This conveyor does not need to include a flotation table since an inner glass surface 2 (FIG. 4) does not touch this conveyor. The pop up stops 240 that border between conveyors 164 & 174, and between 166 & 176 are retracted under the tabletop and the lower lite 112 with the spacer is conveyed onto conveyor 166, and for larger lites (>49") onto conveyor 164 & 166. The pop-up stops 240 are raised up by pneumatic actuators and the glass lite 112 is registered against these stops by motor driven push bars 280, 280 possibly with gravity assistance from the tilting conveyor. This registers the lower lite 112 with respect to the center lite 120.

Step 6: The center lite is lowered onto the lower lite until contact (or near contact) is made with the spacer. At this time the vacuum lift pads release the vacuum and the center lite now engages the spacer that is already attached to the lower lite. A mechanism may also be used to "tack" the edges of the glass to the spacer to prevent shifting or a mis-assembly condition caused by gravity when the lower/center lite are brought vertically by the downstream butterfly table. The tacking process can be achieved by either lowering edge clamps to a predetermined size, using a sensor to determine press position, or using a motor load routine to determine adequate pressing.

The glass lite 120 is corner registered by controlled movement of two push bars 280, 282 forming a part of the vacuum frame assembly 250. These push bars register the lite 120 against the pop up end stops 240 that engage two sides of the glass lite 120. One push bar 280 extends along one side of the vacuum frame assembly 250 in the 'X' direction and a second push bar 282 extends a shorter distance along a generally perpendicular direction to the first. To accommodate small glass sizes, the push bars 280, 282 must clear (pass beneath) the vacuum pads 252 as the bars move inward and outward.

Figure 5:
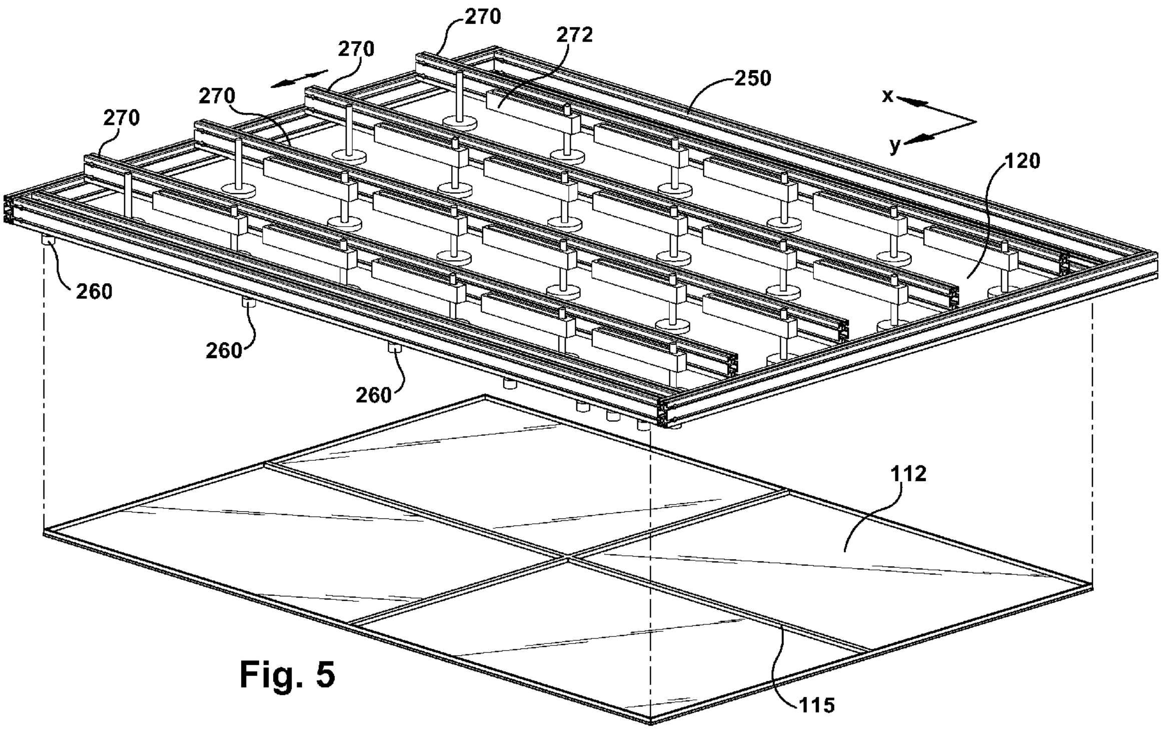
FIG. 5 is a perspective view of a portion of an assembly station for engaging glass lites and raising them above a surface during assembly of the triple pane insulating glass unit.

In the exemplary embodiment, the vacuum pads are oriented in an array as shown and are mounted to cross members 270 (FIG. 5) that extend generally parallel to a direction of glass movement in the 'X' direction These cross members 270 are coupled to a linear bearing 271 supported by a frame 273 for movement back and forth in the 'Y' direction. In the exemplary embodiment each cross member 270 supports six pads 252 and five of the six pads can be moved relative to the cross members along guides 272 attached to a respective one of the cross members 270. As the push bar 282 moves inward to register the lite 120 in a corner of the vacuum assembly, it contacts outer circumferences of one or more pads supported by a first cross member and moves the nearest set of vacuum pads and accompanying cross member. When the vacuum pads coupled to a given cross member reach an end of travel limit near an adjacent row or set of vacuum pads, the push bar 282 stops and the pads are lifted up and over the push bar so the push bar can continue to move toward the stops 240 and register the glass lite 120. During this process one or more additional rows of vacuum pads may be repositioned by the push bar 282.

After the pads raise up out of the way so the push bar can pass beneath, the vacuum pads return to their original position. On a return trip by the push bar, the vacuum pads are again contacted (on the opposite side) by the push bar and moved to their original positions shown in the Figures to await receipt of a next subsequent glass lite at the registration station. Movement of the push bars is accomplished with a suitable drive such as a servo motor coupled through a suitable transmission (not shown). Up and down movement of the pads and pop up stops is accomplished by suitable pneumatic actuators. Both the servo motors and pneumatic actuators along with a vacuum pump operate under control of a controller which in the exemplary embodiment is a programmable controller 200.

Butterfly Table, Adaptive Machine Cycling Routine

Figure 12:
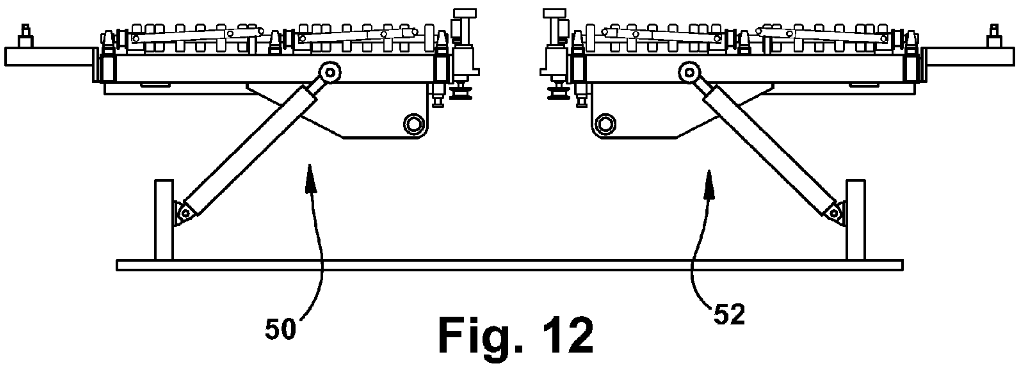
FIGS. 12 and 13 are elevation views of different states of a butterfly table for assembling IGUs prior to heat treatment of sealant that holds them together.
Figure 13:
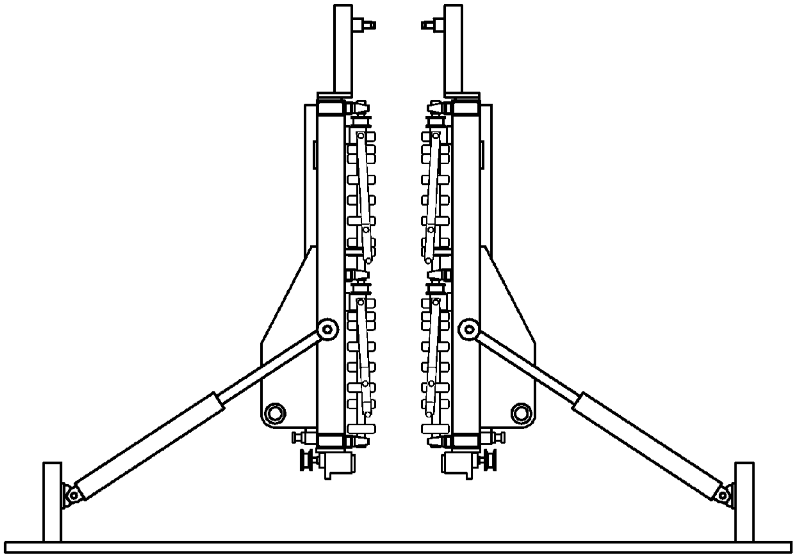

Currently the butterfly tables 50, 52 (FIGS. 12 and 13) are raised and lowered by hydraulic cylinders. See also U.S. Pat. No. 6,553,653) During the pivoting up and down, mechanical limit switches are used to shift the hydraulic cylinders between high and low speeds. This is done so that during the transition from horizontal to vertical, the momentum of the table does not make the glass tip over center when it is near vertical. There is minimal control ability between large (tall)

glass and small glass. All GED assembly tables have functioned in this manner for more than 20 years.

The invention senses the glass size and adapts the butterfly sequence according to a predetermined motion profile. Larger lites need to run slower than smaller lites, especially as the butterfly table approaches vertical. Having adaptive motion technology in the butterfly table can increase throughputs, since it is not necessary to run lites at speeds slower than possible.

To do this, the butterfly table has a servo-controlled system. A servo motor is used in place of the hydraulic system. An electro-pneumatic (proportional air regulator) servo system can also be used, or a ball screw system could be used. There are many ways to accomplish the end goal of coupling the machine's motion profile with a particular glass size. Recipes, or ranges of glass sizes, can be assigned to one motion profile and another range of glass sizes assigned to another profile, etc. . . . . These recipes would be stored in a computer or controller, and they can be recalled either manually or assigned to a specific input by a sensor array.

The invention has been described with a degree of particularity, but it is the intent that it include all modifications and alterations from the disclosed design falling within the spirit or scope of the appended claims.

The invention claimed is:

1. Apparatus for assembling multi-pane insulating glass units comprising:

a) a controller for controlling assembly of a plurality of insulating glass units including both double pane insulating glass units having two lites and triple pane insulating glass units having three lites;

b) conveyors for moving glass lites for forming insulating glass units along controlled travel paths;

c) a first registration station located along a path of travel defined by the conveyors for bringing two lites into registration on opposite sides of a spacer frame; and d) a second registration station spaced from the first registration station also located along a path of travel defined by the conveyors for bringing two lites and a spacer frame previously brought into registration with each other at the first registration station into registration with a third lite and an additional spacer frame to form a triple pane insulating glass unit or bringing an outer lite and spacer frame to which the outer lite is mated into registration with an additional outer lite touted to the second registration station by said controller to form a double pane glass unit.

2. The apparatus of claim 1 wherein one conveyor of the conveyors extends through the first registration station and wherein the one conveyor moves a lite or a pair of lites away from the first registration station to the second registration station.

3. Apparatus for assembling multi-pane insulating glass units comprising:

a) a controller for controlling assembly of a plurality of insulating glass units including both double pane insulating glass units having two lites and triple pane insulating glass units having three lites;

b) conveyors for moving glass lites for forming insulating glass units along controlled travel paths;

c) a first registration station located along a path of travel defined by the conveyors for bringing two lites into registration on opposite sides of a spacer frame comprising a non-contact positioner for moving a middle glass lite entering the first registration station away from an entry position to allow a second lite to move into the first registration station and be registered with the middle glass lite; and d) a second registration station spaced from the first registration station also located along a path of travel defined by the conveyors for bringing two lites and a spacer frame previously brought into registration with each other at the first registration station into registration with a third lite and an additional spacer frame to form a triple pane insulating glass unit.

4. The apparatus of claim 3 wherein the noncontact positioner comprises a plurality of Bernoulli pads that lift the middle glass lite of from a conveyor that delivered the first glass lite to the first registration station.

5. Apparatus for assembling multi-pane insulating glass units comprising:

a) a controller for controlling assembly of a plurality of insulating glass units including both double pane insulating glass units having two lites and triple pane insulating glass units having three lites;

b) conveyors for moving glass lites for forming insulating glass units along controlled travel paths;

c) a first registration station located along a path of travel defined by the conveyors for bringing two lites into registration on opposite sides of a spacer frame; and d) a second registration station spaced from the first registration station also located along a path of travel defined by the conveyors for bringing two lites and a spacer frame previously brought into registration with each other at the first registration station into registration with a third lite and an additional spacer frame to form a triple pane insulating glass unit;

e) wherein a first conveyor splits into two different portions with one portion leading to the first registration station and a second portion leading to the second registration station and further wherein a second conveyor defines a travel path leading to the second registration after passing through the first registration station.

6. The apparatus of claim 5 wherein a non-contact positioner comprises a plurality of Bernoulli pads that lift a first glass lite of from the second conveyor that delivered the first glass lite to the first registration station and to allow the one portion of the first conveyor to move a second lite beneath the first glass lite.

7. Apparatus for assembling multi-pane insulating glass units comprising:

a) a controller for controlling assembly of a plurality of insulating glass units including both double pane insulating glass units having two lites separated from each other by a spacer frame and triple pane insulating glass units having three lites separated from each other by two spacer frames;

b) a transport system comprising a plurality of conveyors for transporting glass lites that have been washed along controlled paths of travel for mating with associated spacer frames to form either a triple pane or a double pane insulating glass unit said transport system defining first and second side by side paths of travel for liter wherein a first path of said side by side paths of travel moves spacer frames that have been mated to an outer lite away from a spacer frame application station;

c) an assembly station located at an end of the side by side paths of travel for registering and bringing into engagement the lites and corresponding spacer frame or spacer frames moving along a respective one of the side by side paths of travel to form either a triple pane or double pane insulating glass unit;

d) a registration station that in part makes up the second path of said first and second side by side paths of travel for forming an intermediate insulating glass unit component comprising an outer lite, a middle lite and a spacer frame for transfer to the assembly station for incorporation into a triple pane insulating glass unit; and e) a cross conveyor for selectively transferring a spacer frame and outside lite assembled at the spacer frame application station to the registration station for fabricating the intermediate insulating glass unit component;

f) wherein the controller selectively actuates the conveyors that make up the transport system to either route a lite and spacer frame over the cross conveyor to make a triple pane insulating glass unit or to route a lite and spacer frame directly to the assembly station to make a double pane insulating glass unit when combined with a lite traversing the second of the first and second side by side paths of travel.

8. Apparatus for assembling multi-pane insulating glass units comprising:

a) a controller for controlling assembly of a plurality of insulating glass units including both double pane insulating glass units having two lites and triple pane insulating glass units having three lites;

b) a conveyor system comprising a plurality of conveyors for moving glass lites along travel paths controlled by said controller for assembly into insulating glass units;

c) a spacer frame assembly station wherein a first, outer lite exiting a washing machine is mated with a spacer frame and moved away from the spacer frame assembly station by the conveyor system;

d) a first registration station located along a path of travel for bringing two lites into registration on opposite sides of a spacer frame wherein a first conveyor brings the first, outer lite and a spacer frame mated to the first, outer lite at the spacer frame assembly station to the first registration station and wherein a second conveyor brings a second lite into registration with the first, outer lite at the first registration station to form an intermediate combination; and e) a second registration station spaced from the first registration station also located along a path of travel defined by the conveyors for bringing the intermediate combination from the first registration station into registration with a third lite and an additional spacer frame to form a triple pane insulating glass unit or bringing the first, outer lite and spacer frame to which the first, outer lite is mated into registration with an additional outer lite routed to the second registration station by said controller to form a double pane insulating glass unit.

* * * * *